United States Patent [19]

Moncur et al.

[11] Patent Number: 5,378,535

[45] Date of Patent: Jan. 3, 1995

[54] PRIMER SYSTEM FOR SILICONE ELASTOMERS

[75] Inventors: Marlowe V. Moncur, Irvine; Janet A. Andrechak, Cypress; Clifford D. Jeungst, Aliso Viejo, all of Calif.

[73] Assignee: Pilkington Aerospace, Inc., Garden Grove, Calif.

[21] Appl. No.: 922,173

[22] Filed: Jul. 29, 1992

[51] Int. Cl.$^6$ .......................... B32B 17/06; B32B 25/20
[52] U.S. Cl. .................... 428/335; 427/299; 427/322; 427/407.2; 427/412.1; 428/330; 428/336; 428/428; 428/429; 428/446; 428/447
[58] Field of Search ............... 428/428, 429, 330, 335, 428/336, 446, 447; 427/299, 322, 407.2, 412.1

[56] References Cited

U.S. PATENT DOCUMENTS

| | | | |
|---|---|---|---|
| 3,312,587 | 4/1967 | Wilson | 428/429 X |
| 4,162,243 | 7/1979 | Lee et al. | 528/31 X |
| 4,196,273 | 4/1980 | Imai et al. | 528/15 |
| 4,329,273 | 5/1982 | Hardman et al. | 524/862 |
| 4,340,709 | 7/1982 | Jeram et al. | 528/15 |
| 4,418,165 | 11/1983 | Polmanteer et al. | 523/210 |
| 4,427,801 | 1/1984 | Sweet | 523/212 |
| 4,525,400 | 6/1985 | Surprenant | 428/54 |
| 4,677,161 | 6/1987 | Suzuki et al. | 524/862 |
| 4,719,262 | 1/1988 | Plueddemann | 525/105 |
| 4,845,164 | 7/1989 | Gutek | 528/15 |

FOREIGN PATENT DOCUMENTS 63-089343  4/1988  Japan .

*Primary Examiner*—D. S. Nakarani
*Attorney, Agent, or Firm*—Pretty, Schroeder, Brueggemann & Clark

[57] ABSTRACT

Primer systems foe silicone elastomers bonded to glass or plastic substrates, particularly those elastomers used as interlayer materials in a transparent lamination of such substrates, are described. The primer system consists of a thin layer of a silica-based adhesion promoter which is applied directly to at least one surface of the substrate. An organosilane primer containing (i) silanol or functional groups that can hydrolyzed to silanol, and (ii) polymerizable alkene or silicon hydride functional groups, or preferably both, is applied over the silica-based adhesion promoter layer. Alternatively, the silicone elastomer may also contain silanol groups or functional groups that can be hydrolyzed to silanol, and polymerizable alkene or silicon hydride functional groups, thereby making a separate primer layer unnecessary. Both components must be present for the primer system to provide a more durable adhesive bond.

32 Claims, No Drawings

PRIMER SYSTEM FOR SILICONE ELASTOMERS

BACKGROUND OF THE INVENTION

1. Field of the Invention

The present invention relates to compositions for enhancing the durability of the adhesive bond between silicone elastomers and substrates. More particularly, it relates to improved primer systems for silicone elastomers used as interlayer materials in the lamination of plastic or glass substrates.

2. Description of Related Art

Thermoset polydimethylsiloxane-based materials are widely used as elastomers, adhesives, sealants, potting compounds, and interlayers. These siloxane materials are normally formulated from one or two component liquid precursors that can be processed by casting, molding, calendaring, extrusion, or other methods known in the art. Depending upon the degree of cross-linking and reinforcement, these cured polysiloxanes can range from very soft materials to relatively hard elastomers.

Transparent silicone materials based on thermoset polydimethylsiloxane copolymers containing silicon-bonded vinyl and hydride functional groups, and which are generally cured by a hydrosilation reaction mechanism catalyzed by a platinum compound, are often used as interlayers to join transparent glass or plastic sheets in laminated transparencies for aircraft and other applications. Reinforcing materials may be added to these elastomers to enhance their strength and toughness.

Transparent silicone interlayers of this type can be placed between a pair of glass or plastic substrates, whether flat or shaped, and joined by conventional lamination procedures. The silicone interlayers may be either pre-formed sheet silicone or formed by casting, i.e., cured-in-place, using liquid silicone precursors. Because adhesion between the cured interlayer and the substrate tends to be very poor unless an effective primer is used, a primer is applied to each substrate surface before the silicone interlayer is laminated between them.

Known primers used in the preparation of transparent laminates containing silicone interlayers, such as AP-132 and AP-133, organosilane primers sold by Lord Chemical, SS-4120 primer sold by General Electric, and 1204 and 1205 primers sold by Dow Corning, provide good initial adhesion, but do not sustain adequate bond durability for extended use outdoors. With these conventional primers, the adhesive bond between the silicone and the substrate is degraded by prolonged exposure to moisture. This often results in delamination. The deleterious effect of water exposure is especially pronounced with glass substrates as well as with glass or plastic substrates having thin film coatings consisting of metals or metal oxides, or both.

Accordingly, the need exists for improved environmental durability of the adhesive bonds between silicone elastomers and glass or plastic substrates.

SUMMARY OF THE INVENTION

The present invention provides an improved primer system for silicone elastomers bonded to glass or plastic substrates, and in particular, to those used as interlayer materials in the lamination of such substrates. The primer system consists of a combination of two separate components preferably applied to each substrate surface contacting a silicone elastomer to provide the particular advantages of the present invention. In particular, the durability of the adhesive bond formed as a result of using the primer system of the present invention is surprisingly superior to that obtained by using conventional primers or by using either of these two components alone.

The first component of the primer system of the present invention is a silica-based adhesion promoter that is applied directly to at least one surface of the substrate. Next, an organosilane primer containing (i) silanol or functional groups that can be hydrolyzed to silanol, and (ii) polymerizable alkene or silicon hydride functional groups, or preferably both, is applied directly over the silica-based adhesion promoter layer, such as by flow coating, and then cured. Alternately, instead of using a separate organosilane primer layer, the silicone elastomer may optionally contain silanol groups or functional groups that can be hydrolyzed to silanol, and polymerizable alkene or silicon hydride functional groups.

The silica-based adhesion promoter may be applied by a physical vapor deposition process, such as sputtering or evaporation, using a silicon, silicon monoxide, or silica source material, or by a chemical vapor deposition process using other silicon-containing raw materials, such as tetrachlorosilane. The silica-based adhesion promoter may also include other metal oxide materials, such as titania.

Preferred functional groups in the organosilane primer that can be hydrolyzed to silanol include chlorosilyl, acetoxysilyl, and alkoxysilyl. Preferred polymerizable alkenes include vinyl, allyl, acrylate, and methacrylate groups.

The substrates are preferably selected from the group consisting of glass substrates, glass substrates having a transparent thin film coating, plastic substrates, and plastic substrates having a transparent thin film coating. Preferred thin film coatings include metals and metal oxides, such as gold, tin oxide, indium tin oxide, and titanium dioxide. Preferably, the substrates are transparent.

Laminates formed with a silicone elastomer interlayer and the primer systems of the present invention are especially useful as aircraft transparencies or as windows for military ground vehicles.

DETAILED DESCRIPTION OF THE INVENTION

The present invention comprises an improved primer system for bonding silicone elastomers to glass or plastic substrates, such as those elastomers used as interlayer materials in the lamination of such substrates. The primer system consists of a combination of two components having different properties preferably applied as separate layers to the substrate. A thin layer of a silica-based adhesion promoter is applied directly to at least one surface of the substrate, followed by an organosilane primer layer as described below. If preferred, the silicone elastomer may contain those functional groups identified below as part of the organosilane primer, thereby making a separate primer layer unnecessary. The present invention also comprises a process for coating substrates with an improved primer system and the manufactured articles as described herein.

The transparent substrates used in the laminates containing the primer system of the present invention may be made from any of the materials suitable for use as a window in airplanes or military ground vehicles. Such materials generally include glass and transparent plastics. Particularly useful plastic substrates include, but are not limited to, polycarbonates and acrylics, both stretched and cast. For purposes of the present invention, at least one of the substrate surfaces on the inside of the laminate, in contact with the silicone interlayer, preferably includes a transparent thin film coating. The primer systems of the present invention may also be used advantageously on uncoated glass and plastic substrate surfaces. The substrates may be monolithic or a laminated combination of glass, plastic, and elastomeric components as is known in the art. The substrates are preferably cleaned using techniques known in the art before the primer systems of the present invention are applied.

The transparent thin film coating is usually applied by a vacuum deposition process, such as sputtering or evaporation. Suitable transparent thin film coatings may also be electrically conductive and include known dielectric or semiconductor metal oxide materials, used alone or in combination with a metal layer. Such metal oxides include indium tin oxide (referred to herein as "ITO"), titanium dioxide ($TiO_2$), tin oxide ($SnO$), bismuth oxide ($Bi_2O_3$), and germanium oxide ($GeO_2$). Suitable metals that can be sandwiched between layers of such semiconductor oxides include gold and silver. The layers of the metal oxide material on both sides of the metal layer are usually substantially thicker than the metal layer therebetween. Suitable examples include an ITO/Au/ITO stack and a $TiO_2/Au/TiO_2$ stack in which the oxide layers are about 400 Å to about 700 Å thick and the gold layer is about 100 Å thick. In electrically conductive films in which a semiconductor oxide layer is used alone, its thickness is usually greater, e.g., on the order of about 2,000 to 6,000 Å.

The first component of the primer system is a silica-based adhesion promoter layer which also functions as a barrier, and is essential where the substrate has a conductive thin film coating. The silica-based adhesion promoter is applied directly to the surface of the substrate by either a physical vapor deposition or a chemical vapor deposition process. Physical vapor deposition processes include sputtering and electron beam or filament evaporation. Preferred source materials for such physical vapor deposition processes include silicon, silicon monoxide, and silica. The chemical vapor deposition process may employ other types of silicon-containing raw materials, such as tetrachlorosilane. The silica-based adhesion promoter may be a silicon oxide with less than the stoichiometric proportion of oxygen necessary to form $SiO_2$. Other elements may also be present, such as carbon or nitrogen, as long as transparency is not affected. The silica-based adhesion promoter may also include coatings which comprise a mixture of a silicon oxide and another metal oxide, such as a mixed silica/titania film. The thickness of the silica-based adhesion promoter layer may range from about 0.001 to about 0.5 microns (10 to 5,000 Å), preferably from about 0.005 to about 0.1 micron (50 to 1000 Å).

The second component of the transparent protective coating systems of the present invention is an organosilane primer which provides a "bridge" between the silica layer and the silicone elastomer. The organosilane is formulated from components having both (i) silanol functionality and (ii) polymerizable alkene groups or silicon hydride groups, or preferably both. By "silanol-functionality" is meant those components having the following general formulas:

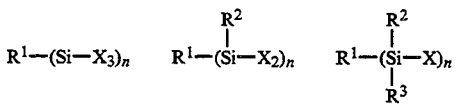

where n is an integer: X is $-Cl$, $-OH$, $-OR^2$, or $-O_2CR^3$; $R^1$ is an organic radical which may be a part of a polymer chain, and which may also contain polymerizable alkene groups or silicon hydride groups; and $R^2$ and $R^3$ are alkyl radicals with from 1 to 6 carbon atoms or $-O-Si(CH_3)_3$ groups.

Polymerizable alkene-containing components include those having the following general formulas:

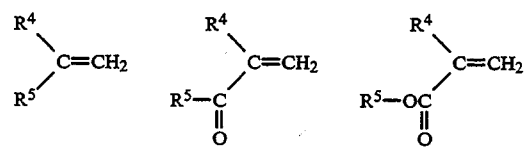

where $R^4$ is $-H$ or an alkyl radical with from 1 to 6 carbon atoms; and $R^5$ represents an organic radical which is part of a polymer chain ant which may also contain silanol-functional groups. Preferred polymerizable alkene groups include vinyl, allyl, acrylate, and methacrylate groups.

Silicon hydride-containing components include those having the following general formulas:

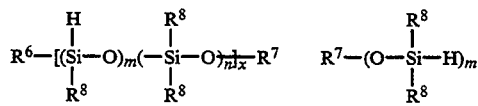

where n, m and x are integers; $R^6$ and $R^7$ represent organic radicals, which may be part of polymer chains and which may also contain silanol-functional groups; and $R^8$ are alkyl radicals with from 1 to 6 carbon atoms or $-OSi(CH_3)_3$ groups.

The organosilane component may be monomeric, polymeric, or mixtures of both. The thickness of the organosilane primer layer ranges from about 0.01 to about 50 microns (1,000 to 500,000 Å), and preferably from about 0.1 to about 5 microns (1,000 to 50,000 Å).

The organosilane primer is applied by common coating methods well known in the art, such as spray, flow, dip, or wipe-on processes from a solution containing non-reactive organic diluents. The coated primer film is air dried to allow solvents to evaporate, and may be cured at an elevated temperature as well. In addition, the coating solution typically contains one or more catalysts to promote the reaction of the silanol, alkene, or hydride groups.

Organosilane primers of the present invention are commercially available in formulated form, such as, for example, from Dow Corning in Midland, Mich., product nos. X3-1544, X3-6117, and X3-6340. In the alternative, primers described by the general formulas above can be prepared from commercially available materials, as shown by Primer 1 below.

Preferred organosilane primers were formulated for purposes of the examples described below, and have been identified as "Primer 1," "Primer 2," etc. for convenience. It should be pointed out, however, that Primer 4 is not an organosilane primer in accordance with the present invention, as it does not include polymerizable alkene or silicon hydride groups. It has been included for comparative purposes only. As described in the examples, the primer layers were applied by flow coating and then cured in place by air drying or a combination of air drying and oven baking. These formulated primers are as follows:

| PRIMER 1 | WT % |
|---|---|
| 1-Butanol | 17.1 |
| Toluene | 5.8 |
| Denatured Alcohol | 11.8 |
| Methanol | 11.8 |
| Acetone | 2.4 |
| SRC-18 (A Silicone Catalyst from General Electric) | 1.5 |
| Allyltriethoxysilane | 24.8 |
| 1,1,3,3,5,5,7,7-octamethyltetrasiloxane | 24.8 |

Procedure For Preparing Primer 1:

Mix the solvents in the above-listed order. Suction filter the solvent mixture through a Whatman #1 filter paper. To the filtered solvent mixture, add the SRC-18 with good mixing. Add the remaining silanes in the order above with good mixing. Store refrigerated in a dry polypropylene bottle. At 40° F., the shelf-life is over 3 months.

| | WT % |
|---|---|
| PRIMER 2 | |
| Methyl Butenol | 79 |
| Ethyl Acetate | 7 |
| Methylmethacrylate/Alkoxysilylmethacrylate Copolymer | 2 |
| Alkoxy-functional,Olefinic,Silyl Hydrocarbon | 2 |
| t-Butylperoxy Isopropyl Carbonate | 7 |
| Petroleum Naphtha | 2 |
| Methyl Hydrogen Polysiloxane | 1 |
| PRIMER 3 | |
| Methyl Butenol | 88 |
| Ethyl Acetate | 8 |
| Methylmethacrylate/Alkoxysilylmethacrylate Copolymer | 2 |
| Alkoxy-functional,Olefinic,Silyl Hydrocarbon | 1 |
| 1,2-bis(trimethoxysilyl)ethane | 1 |

Primers 2 and 3:

Primers 2 and 3 are commercially available in premixed form from Dow Corning as product nos. X3-1554 and X3-6340, respectively, both of which have an expected shelf life at 40° F. of at least one year.

| PRIMER 4 | WT % |
|---|---|
| AP-133 (An Organosilane Primer from Lord Chemical) | 49.5 |
| Methanol | 11.9 |
| Denatured Alcohol | 11.9 |
| Toluene | 5.9 |
| Acetone | 2.5 |
| 1-Butanol | 17.3 |
| SRC-18 (A Silicone Catalyst from General Electric) | 1.0 |

Procedure For Preparing Primer 4:

Mix the solvents in the above-listed order. Suction filter the solvent mixture through a Whatman #1 filter paper. Add the SRC-18 with good mixing to the filtered solvent mixture, and then add the AP-133. Store refrigerated in a dry polypropylene bottle. At 40° F., the expected shelf life is approximately one year.

The improved primer systems of the present invention are particularly effective with silicone elastomer materials that cure by a hydrosilation (addition) reaction mechanism. Preferred silicone elastomers are transparent, reinforced materials such as the following, which were used in the examples below:

Silicone Interlayer 1: A silicone resin available from Shin-Etsu Chemical Co., Ltd. in Tokyo, Japan, No. KE-1935, and formulated at a 3A:1B ratio.

Silicone Interlayer 2: A high modulus sheet silicone available from Dow Corning in Midland, Mich., No. X4-4643.

Both the silica-based adhesion promoter and the organosilane primer described above are essential for obtaining the advantages of the present invention. As the following examples demonstrate, both components play an important function and must be present for the primer system to provide a more durable adhesive bond. The silica-based adhesion layer must be present to avoid failures at the primer/substrate interface caused by exposure to such environmental conditions as humidity, water, heat, ultraviolet radiation, and the like. Since silicone elastomers de not adhere strongly to silica, the primer layer functions to act as a bridge between them to obtain good adhesion.

In order to more fully and clearly describe the present invention so that those skilled in the art may better understand how to practice the present invention, the following examples are given. These examples are intended to illustrate the invention and should not be construed as limiting the invention disclosed and claimed herein in any manner.

Description of Test Procedure

The following test procedure was used in testing each of the samples described below:

Humidity Testing

Each sample described below was prepared using an aluminum back-up strip adhered to the outside silicone interlayer surface. The initial peel strength was measured in pounds per inch width (PIW) using a 90° peel test according to ASTM D-3167 and peeled at a rate of 2 inches/minute. The samples were then exposed to 120° F. (49° C.) and 100% relative humidity. After the indicated exposure time, the peel strength was again measured using the 90° peel test after the sample was allowed to equilibrate to room temperature, generally after about 4 hours.

EXAMPLES

Example 1

Soda lime glass (0.187 inch thick) having a transparent, electrically conductive indium tin oxide (ITO) coating (HYVIZ, available from Pilkington Aerospace Ltd. in Birmingham, United Kingdom) was used to prepare test specimens for adhesion and humidity aging tests. A layer of silica, about 150 Å thick, was applied to the ITO surface by a filament evaporation process. Primer 1 was flow coated onto the silica surface, air dried for 30 minutes, and then oven cured for 1 hour at 200° F. Silicone Interlayer 1 (0.187" thick) was cast against the primed surface and cured for 18 hours at 200° F.

Example 2 (Comparative)

Specimens were prepared as in Example 1 except that the silica layer was omitted.

Example 3

Specimens were prepared as in Example 1 except that Primer 2 was used instead of Primer 1. Primer 2 was applied to the silica surface by wiping with a lint-free cloth saturated with the primer, air drying for 15 minutes, followed by a second primer application which was air dried for a minimum of 1 hour before silicone lamination.

Example 4 (Comparative)

Specimens were prepared as in Example 3 except that the silica layer was omitted.

Example 5

Specimens were prepared as in Example 3 except that Primer 3 was used instead of Primer 2. Primer 3 was applied using the same method as Primer 2.

Example 6 (Comparative)

Specimens were prepared as in Example 5 except that the silica layer was omitted.

Example 7 (Comparative)

Specimens were prepared as in Example 1 except that Primer 4 was used instead of Primer 1. Primer 4 was flow coated onto the silica surface, air dried for 0.5 hour, and then oven cured for 1 hour at 200° F.

Example 8

Specimens were prepared as in Example 3 except that Silicone Interlayer 2 was used instead of Silicone Interlayer 1. Silicone Interlayer 2 was laminated using a conventional vacuum bag/autoclave process. The specimens were laminated at 185 psi pressure and 215° F. for 4 hours. The specimens were then postcured for 14 hours at 200° F.

Example 9

Specimens were prepared as in Example 8 except that Primer 3 was used instead of Primer 2.

Example 10 (Comparative)

Specimens were prepared as in Example 9 except that the silica layer was omitted.

Example 11

Specimens were prepared as in Example 1 except that uncoated soda lime glass (0.187 inch thick) was used instead of the ITO coated glass.

Example 12 (Comparative)

Specimens were prepared as in Example 11 except that the silica layer was omitted.

Example 13

Specimens were prepared as in Example 11 except that Primer 2 was used instead of Primer 1.

Example 14 (Comparative)

Specimens were prepared as in Example 13 except that the silica layer was omitted.

TABLE 1

| EXAMPLE | PRIMER | SUBSTRATE | CONDUCTIVE COATING | SILICONE INTERLAYER | SiO$_2$ | 0 PEEL STRENGTH (PIW) | 2 PEEL STRENGTH (PIW) | 4 PEEL STRENGTH (PIW) | 8 PEEL STRENGTH (PIW) | 20 PEEL STRENGTH (PIW) |
| --- | --- | --- | --- | --- | --- | --- | --- | --- | --- | --- |
| | | | | | | | EXPOSURE[1] TIME IN WEEKS | | | |
| 1 | 1 | GLASS | ITO | 1 | YES | 72 | 59 | 62 | 54 | 59 |
| 2 | 1 | GLASS | ITO | 1 | NO | 60 | 50 | 41 | 11 | 17 |
| 3 | 2 | GLASS | ITO | 1 | YES | 68 | 48 | 55 | 61 | 45 |
| 4 | 2 | GLASS | ITO | 1 | NO | 77 | 79 | — | 61 | 24 |
| 5 | 3 | GLASS | ITO | 1 | YES | 82 | 79 | 69 | 42 | 48 |
| 6 | 3 | GLASS | ITO | 1 | NO | 66 | 73 | 72 | 16 | 14 |
| 7 | 4 | GLASS | ITO | 1 | YES | 54 | 20 | 21 | — | — |
| 8 | 2 | GLASS | ITO | 2 | YES | — | 38 | 52 | 60 | 51 |
| 9 | 3 | GLASS | ITO | 2 | YES | 45 | 49 | 42 | 36 | 27 |
| 10 | 3 | GLASS | ITO | 2 | NO | 4 | 4 | 5 | 10 | 6 |
| 11 | 1 | GLASS | NONE | 1 | YES | 88 | 60 | 66 | — | 68 |
| 12 | 1 | GLASS | NONE | 1 | NO | 61 | 58 | 63 | 58 | 63 |
| 13 | 2 | GLASS | NONE | 1 | YES | 74 | 81 | 74 | 89 | 59 |
| 14 | 2 | GLASS | NONE | 1 | NO | 58 | 62 | 19 | 24 | 21 |

[1]EXPOSURE AT 120° F./100% RH

As shown by the results of the testing set forth in Table 1, both of the components of the primer systems of the present invention are necessary to obtain improved durability of the adhesive bond between the silicone elastomer and the substrate. In particular, those examples of the present invention (nos. 1, 3, 5, 8, 9, 11, and 13) retained good adhesion after the described humidity test, on the average losing less than about 30% of their initial adhesion. Significantly, those comparative examples that omitted the silica-based adhesion promoter layer (nos. 2, 4, 6, 10, 12, and 14) had comparatively very poor adhesion after the humidity test, although example 12 appears to be an anomaly as its peel strength would have been predicted to be similar to that of example 14. In addition, example 10 showed extremely poor peel strength from the start. A similar lack of adhesion after the humidity test is also shown by the comparative example lacking a primer layer in accordance with the present invention (example 7), although it should be noted that the exposure of this example extended only through four weeks.

Other modifications and variations of the present invention are possible in light of the above teachings. For example, additives and other modifying agents may be added to one or more of the layers of the primer systems of the present invention. It is to be understood, however, that changes may be made in the particular embodiments described above which are within the full intended scope of the invention as defined in the appended claims.

What is claimed is:

1. A primer system for adhering a silicone elastomer to a substrate, comprising
   (a) a first layer of a silica-based adhesion promoter which is applied to at least one surface of the substrate, the silica-based adhesion promoter layer having a thickness from about 0.001 to about 0.5 microns; and (b) a second layer of an organosilane primer which is applied over the silica-based adhesion promoter layer, wherein the organosilane includes silanol groups or functional groups that can be hydrolyzed to silanol, and polymerizable alkene and silicon hydride functional groups, and the organosilane primer layer has a thickness from about 0.01 to about 50 microns.

2. The primer system of claim 1 wherein the silica-based adhesion promoter layer is applied to the substrate by physical vapor deposition or by chemical vapor deposition.

3. The primer system of claim 2 wherein the silica-based adhesion promoter layer is applied to the substrate by sputtering.

4. The primer system of claim 2 wherein the silica-based adhesion promoter layer is applied to the substrate by evaporation.

5. The primer system of claim 1 wherein the silica-based adhesion promoter layer is a mixture of a silicon oxide and at least one other metal oxide.

6. The primer system of claim 1 wherein the silica-based adhesion promoter layer has a thickness from about 0.005 to about 0.1 microns.

7. The primer system of claim 1 wherein the organosilane primer layer has a thickness from about 0.1 to about 5 microns.

8. The primer system of claim 1 wherein the functional groups in the organosilane that can be hydrolyzed to silanol are selected from the group consisting of chlorosilyl, acetoxysilyl and alkoxysilyl.

9. The primer system of claim 1 wherein the polymerizable alkene groups are selected from the group consisting of vinyl, allyl, acrylate and methacrylate groups.

10. The primer system of claim 1 wherein the substrate is selected from the group consisting of glass substrates, plastic substrates, glass substrates having a transparent thin film coating, and plastic substrates having a transparent thin film coating.

11. A transparent laminate, comprising
a transparent substrate bonded to a silicone elastomer, wherein at least a part of the surface of the substrate contacting the silicone elastomer is coated with a primer system comprising (a) a first layer of a silica-based adhesion promoter which is applied to the substrate, the silica-based adhesion promoter layer having a thickness from about 0.001 to about 0.5 microns, and (b) a second layer of an organosilane primer which is applied over the silica-based adhesion promoter layer, wherein the organosilane contains silanol groups or functional groups that can be hydrolyzed to silanol, and polymerizable alkene and silicon hydride functional groups, and the organosilane primer layer has a thickness from about 0.01 to about 50 microns.

12. The laminate of claim 11 wherein the silica-based adhesion promoter layer is applied by physical vapor deposition or by chemical vapor deposition.

13. The laminate of claim 11 wherein the silica-based adhesion promoter layer is a mixture of a silicon oxide and at least one other metal oxide.

14. The laminate of claim 11 wherein the functional groups in the organosilane that can be hydrolyzed to silanol are selected from the group consisting of chlorosilyl, acetoxysilyl and alkoxysilyl.

15. The laminate of claim 11 wherein the polymerizable alkene groups are selected from the group consisting of vinyl, allyl, acrylate and methacrylate groups.

16. The laminate of claim 11 wherein the substrate is selected from the group consisting of glass substrates, plastic substrates, glass substrates having a transparent thin film coating, and plastic substrates having a transparent thin film coating.

17. The laminate of claim 11 wherein a second transparent substrate is bonded to a surface of the silicone elastomer opposite from the first transparent substrate.

18. The laminate of claim 17 wherein at least a part of the surface of the second transparent substrate contacting the silicon elastomer is coated with the primer system.

19. A transparent laminate, comprising
a pair of transparent substrates bonded together by a silicone elastomer interlayer,
the surfaces of the transparent substrates contacting the silicone elastomer having a primer system applied thereto, the primer system comprising (a) a silica-based adhesion promoter layer applied to each such surface, the silica-based adhesion promoter layer having a thickness from about 0.005 to about 0.1 microns; and (b) an organosilane primer which is applied over the silica-based adhesion promoter layer, the organosilane containing silanol groups or functional groups that can be hydrolyzed to silanol, and polymerizable alkene and silicon hydride groups, and the organosilane primer layer having a thickness from about 0.01 to about 50 microns.

20. The laminate of claim 19 wherein the silica-based adhesion promoter layer is applied by physical vapor deposition or chemical vapor deposition.

21. The laminate of claim 19 wherein the silica-based adhesion promoter layer is a mixture of a silicon oxide and at least one other metal oxide.

22. The laminate of claim 19 wherein the functional groups in the organosilane that can be hydrolyzed to silanol are selected from the group consisting of chlorosilyl, acetoxysilyl and alkoxysilyl.

23. The laminate of claim 19 wherein the polymerizable alkene groups are selected from the group consisting of vinyl, allyl, acrylate and methacrylate groups.

24. The laminate of claim 19 wherein the substrate is selected from the group consisting of glass substrates, plastic substrates, glass substrates having a transparent thin film coating, and plastic substrates having a transparent thin film coating.

25. A transparent laminate comprising a transparent substrate bonded to a silicone elastomer containing (i) silanol groups or functional groups that can be hydrolyzed to silanol, and (ii) polymerizable alkene and silicon hydride functional groups, wherein the surface of the substrate contacting the silicone elastomer is coated with a silica-based adhesion promoter layer having a thickness from about 0.001 to about 0.5 microns.

26. The laminate of claim 25 wherein the silica-based adhesion promoter layer is applied by physical vapor deposition or by chemical vapor deposition.

27. The laminate of claim 25 wherein the silica-based adhesion promoter layer is a mixture of a silicon oxide and at least one other metal oxide.

28. The laminate of claim 26 wherein the functional groups that can be hydrolyzed to silanol are selected from the group consisting of chlorosilyl, acetoxysilyl and alkoxysilyl.

29. The laminate of claim 26 wherein the polymerizable alkene groups are selected from the group consisting of vinyl, allyl, acrylate and methacrylate groups.

30. The laminate of claim 25 wherein the substrate is selected from the group consisting of glass substrates, plastic substrates, glass substrates having a transparent thin film coating, and plastic substrates having a transparent thin film coating.

31. A method for applying a transparent primer system to implore the durability of the adhesive bond between a silicone elastomer and a substrate, comprising (a) applying a first layer of a silica-based adhesion promoter to at least one surface of the substrate, the silica-based adhesion promoter layer having a thickness of about 0.001 to about 0.5 microns;

(b) applying over the silica-based adhesion promoter layer a second layer comprising an organosilane primer, wherein the organosilane includes silanol groups or functional groups that can be hydrolyzed to silanol, and polymerizable alkene and silicon hydride groups, and the organosilane primer layer has a thickness from about 0.01 to about 50 microns; and (c) curing the organosilane primer layer.

32. The article manufactured by the process of claim 31.

* * * * *

UNITED STATES PATENT AND TRADEMARK OFFICE
CERTIFICATE OF CORRECTION

PATENT NO. : 5,378,535

DATED : January 3, 1995

INVENTOR(S) : Marlowe V. Moncur; Janet A. Andrechak & Clifford D. Jeungst

It is certified that error appears in the above-indentified patent and that said Letters Patent is hereby corrected as shown below:

In the Abstract, line 1, change "foe" to --for--.

In column 4, line 25, change "ant" to --and--.

In column 6, line 19, change "de" to --do--.

In column 11, line 11, change "implore" to --improve--.

Signed and Sealed this

Fourteenth Day of March, 1995

Attest:

BRUCE LEHMAN

*Attesting Officer*  *Commissioner of Patents and Trademarks*